United States Patent Office 3,539,374
Patented Nov. 10, 1970

3,539,374
POROUS ARTICLE
Robert B. Isaacson, Rahway, N.J., assignor to Celanese Corporation, New York, N.Y., a corporation of Delaware
No Drawing. Filed Nov. 16, 1966, Ser. No. 594,657
Int. Cl. B29d 27/00; B32b 31/12
U.S. Cl. 117—7         6 Claims

ABSTRACT OF THE DISCLOSURE

A metal-coated plastic substrate is made by coating the plastic substrate with metal and then stretching the composite. This stretching causes the entire article to become microporous and thus useable in rescue blankets, sleeping bags and the like.

---

This invention relates to coated non-conductive microporous materials. More particularly, a process for depositing a coating on a plastic substrate so as to produce a coated plastic product having an open-celled, low density structure and to such structures produced by such process is disclosed. A process for metallizing a plastic substrate to produce a metallized open-celled structure and to such metallized structures is disclosed.

It is known to coat, e.g., metallize, non-conductive, e.g., plastic, articles not only for decorative purposes but also for many important functional purposes. The depositing of a coating on a plastic substrate not only produces a product which has the inherent properties of the plastic substrate, in addition to the desired properties of the deposit, but it often has the effect of eliminating certain undesirable properties of the plastic per se, thus offering utilization of many plastic materials which ordinarily could not be suitably utilized. For example, an increase in tensile, impact and flexural strength and in resistance to abrasion and to distortion under heat can be imparted by the metallization of plastics with the elimination of undesirable properties of said plastics, such as absorption of oils, solvents, and moisture, which may cause swelling or distortion of the basic organic material.

More specifically, in the metallization of plastic films, it is known that proper choice and thickness of a coating metal can substantially increase the thermal insulating characteristics of said film by increasing the heat-reflecting characteristics of same. The heat-reflecting characteristics of the metallized film is obviously a desirable property which finds applicability in thermally insulated products, e.g., rescue blankets, sleeping bags, as well as clothing in which the wearer is subjected to extreme hot or cold temperatures.

While the metallized plastic films heretofore known have been found of value in this field of use, certain serious limitations, however, have been encountered. One such limitation is attributable to the discomfort caused by the inability of said coated films to "breathe," i.e., permit ample transpiration of water vapor, gas, skin moisture, etc. through said film. A proposed solution to this problem has been the provision of relatively large holes, apertures, and/or perforations by needles in said films. This proposal is undesirable in that the effect of transpiration is non-uniform over the film area and the thermal insulating characteristic of the films is seriously diminished.

Another specific application of plastic films is for insulating material which may be wrapped around electrical conduits, wires, and the like. Necessarily such films require excellent dielectric properties along with the ability to dissipate heat, etc. An example of one material which may be applied to plastic film substrates by vapor phase deposition is poly-para-xylylene, a completely linear, highly crystalline material.

This material can be deposited onto the surface of the film substrate as a continuous adherent coating in thicknesses ranging from about 0.2 micron up to about 20 microns and higher. The resulting coating can be classed as a primary dielectric material because of the very low dissipation factor which changes only slightly with frequency. The benefit accruing from a film coated with the above dielectric material and which also exhibits a porous, open-celled structure are easily recognizable.

In accordance with the present invention, there is provided novel coated films which have an open-celled structure, i.e., innumerable, pore-like apertures or voids which permit ample transpiration of moisture and other vapors but which also manifest the benefits accruing from the particular coating thereon. These effects are essentially uniform over the entire area of said coated films as distinguished from the effects produced by the films which have said holes or apertures therein or which have been perforated by needles, etc. The continuous uniform microporous nature of the coated films of the present invention is, therefore, a decided advantage.

Broadly, the present invention provides a coated film of a polymer said coated film being characterized by an open-celled structure and an apparent density lower than the actual density of the polymer when said film is stretched. Accordingly, said film is prepared by suitably coating, e.g., by metallizing, vapor phase depositing, etc., a film prepared from a polymer of at least 40% crystallinity and an elastic recovery from 50% strain of at least 60% at 25° C. and subsequently drawing said film and annealing said film under tension.

As used herein, the term "open-celled structure" signifies that the major portion of the void or pore space of the structure within the geometric confines of the film is accessible to the outside planar surfaces of the film.

The films which are suitably coated in accordance with the invention are formed from precursor films of a relatively crystalline film-forming polymer having an elastic recovery at zero recovery time (hereinafter defined) at 25° C. and 65% relative humidity, of at least about 50% when subjected to a standard strain (extension) of 50%, and preferably an elastic recovery at zero recovery time of at least about 80% when subjected to a strain of 50%. These precursor films, as well as the preparation thereof, are further defined in copending application Ser. No. 572,601, filed Aug. 15, 1966.

It should be noted that although a standard strain of 50% is used to identify the elastic properties of the precursor films of this invention, such strain is merely exemplary. Such precursor films will, of course, generally have elastic recoveries even higher at strains less than 50% than they do at 50% strain, and such films also have relatively high elastic recoveries at strains substantially higher than 50%, e.g., from strains of say 100%.

The precursor film utilized must be differentiated from film formed from classical elastomers. With such classical elastomers the stress-strain behavior, and particularly the stress-temperature relationship, is governed by an entropy-mechanism of deformation (rubber elasticity). The positive temperature coefficient of the retractive force, i.e., decreasing stress with decreasing temperature and complete loss of elastic properties at the glass transition temperature are particular consequences of entropy-elasticity. The elasticity of the precursor films of this invention, on the other hand, is of a different nature. In qualitative thermodynamic experiments with these precursors, increasing stress with decreasing temperature (negative temperature coefficient) may be interpreted to mean that the elasticity of said materials was not governed by entropy effects but depends on the energy term. More significantly, it was found that the precursor films of this invention retained their "stretch" properties at temperatures where entropy-elasticity could no longer be operative. Thus, it may be concluded that the "stretch" mechanism of the precursor films is based on energy-elasticity and may be referred to as "non-classical" elastomers.

The above characteristics necessary to the precursor films can be accomplished by employing a critical combination of process variables and process steps. Broadly the necessary process steps comprise the forming, i.e., extrusion of the films under critical conditions followed by an annealing step to impart the desired degree of elasticity. The necessary process conditions comprise: (1) a rapid rate of drawdown, (2) a high drawdown ratio and, (3) a low melt temperature, i.e., a melt temperature substantially closer to the melt temperature of the film-forming polymer than in conventional extrusion processes.

The rapid rate of drawdown may be accomplished, for example, in slit die extrusion by providing the take-up roll or spool for the extruded film at a distance not more than two inches, and preferably, not more than one inch, from the extrusion slit or orifice. At the same time, said take-up roll must be operated at a high rate, e.g., a speed of at least 25 feet/min. of the film, measured at said roll since the take-up rate of the film actually varies at the extrusion slit (where the film is relatively thick) and at the take-up roll (where the film is comparatively thinner).

The drawdown ratios suitably employed to prepare the precursors range as high as 1000:1 and preferably range from about 75:1 to about 125:1.

The melt temperature for extrusion of the precursors is in general no higher than 100° C. above the melting point of the polymer and most suitably in the range of 10 to 40° C. above such melting point, while the drawdown ratio of extrusion, i.e., ratio of linear velocity of the take-up roll to the linear velocity of extrusion is at least 20:1. The annealing step is generally carried out at a temperature in the range of about 5 to 100° C. below the melting point of the polymer for the period of at least 1 second.

In accordance with the present invention, the precursor film is then subjected to a coating step. It is to be understood that the method employed for depositing the desired coating to the film surface depends upon the nature of the basic film material being coated, e.g., polymer utilized, physical characteristics, as well as upon the coating material being deposited and the functional use of the film product when finally coated.

In the instance of metallizing the film substrate, the present invention contemplates use of any of the following methods:

(1) Vacuum metallizing (metal evaporation).
(2) Chemical reduction (formation of films of silver, copper, nickel, etc.)
(3) Cathode sputtering
(4) Silver spraying
(5) Electrodeposition
(6) Miscellaneous methods such as conductive paints, metal spray, gas plating, conductive plastics and the like.

Vacuum metallizing, i.e., metal evaporation, is the especially preferred method employed for employing metallic coatings of the present invention.

Non-limiting examples of metals which may be applied to the precursor films of the present invention include aluminum, antimony, beryllium, cadmium, chromium, cobalt, copper, germanium, gold, magnesium, molybdenum, nickel, palladium, platinum, selenium, silver, tin, zinc and the like.

As mentioned, the precursor films of the present invention are preferably metallized by the vacuum-metallization technique. Briefly, such technique comprises the following steps:

(1) A base coating of lacquer is preferably first applied to the film, to improve its surface and provide a better bond with the metal. Basically, one of two types of coatings may be used: the type which dries extremely fast through evaporation of a solvent, or the curing type, which either oxidizes or polymerizes by baking, prior to metallization. It has been found that curing temperature has a definite effect on the quality of the resultant coating and hence high temperatures are generally desirable. Generally, curing temperatures range above 200° F.

(2) The roll of film to be coated is then placed on specially-designed holding means from which the film is wound inside a metallizing chamber, i.e., a closed chamber in which the pressure is reduced to as little as 0.1 micron ($1 \times 10^{-4}$ mm. Hg). The required vacuum is generally accomplished in several stages, the first of which employs conventional mechanical vacuum pumps, the second of which employs one or several oil-diffusion pumps. Considerable effort must be expended to avoid "backstreaming" of oil molecules into the vacuum-metallizing chamber. This backstreaming slows down the cycle and mars the appearance of the finished product. Typical means for eliminating backstreaming is means attached to a diffusion pump which intercepts and condenses the oil molecules and directs the droplets back into the boiler. This development is found to reduce backstreaming by one hundredfold and reduces total pumpdown time in the high vacuum range. If desired, a series of mechanical booster pumps may be employed which cuts down pumping time substantially, especially on humid days, so that refrigerated moisture traps are not needed.

(3) The third step comprises vaporizing the metal while unwinding the film fed into the metallizing chamber and rewinding the thus-metallized film upon another spool. For aluminum coating, which is generally the most frequent, small high purity aluminum staples are hung from coils of stranded tungsten wire near the center of the chamber. These filaments are electrically heated to incandescence at about 1200° F. Due to the high capillary affinity of aluminum and tungsten, the aluminum as it melts, spreads thinly over the tungsten filaments and is ready to evaporate when a temperature of the filament is raised abruptly to between 1800° F. and 2500° F. Evaporation or flashing of the filaments, does not take over 5 to 10 seconds. The molecules of vaporized metal travel in a straight line, and condense on the exposed film surface, resulting in a coating of high reflectance.

The coating deposited on the precursor film is generally from about 0.01 micron to about 20 microns or more and preferably from about 0.02 to about 1 micron.

It is found that one of the primordial requirements for successful vacuum-metallization is an absolutely clean and dry surface of the film to be coated. In order to minimize the adverse affect of humidity, ultra low temperature, mechanical refrigeration is frequently employed. For example, two-stage refrigeration units can be used which "cryogenically" pump out water vapor and other condensable gases, at a very high degree of vacuum. Dust- or lint-free finishing areas are also necessary in order to maintain suitable metallized film quality.

(4) Following the metallization step, the wound metallized film is removed from the vacuum metallizing area and if desired, the film is given a top coating of lacquer which may be employed as a carrier for color, e.g., to simulate gold, brass or other colored metallic effects.

Obviously, various modifications and adaptations may be incorporated into the foregoing metallization technique inasmuch as said technique per se does not constitute any part of the present invention.

In instance of depositing a polymeric coating on the precursor film substrate the following represents a typical technique. In this embodiment, i.e., the deposition of poly-para-xylylene, pure di-p-xylylene is heated in a sublimation chamber and pyrolized in the vapor phase at about 550° C. to yield the monomer. The resulting p-xylylene is introduced into a polymerization chamber where the monomer vapor is cooled to temperature below 50° C. and where it condenses and polymerizes on the film substrate.

The present invention contemplates the depositing of any suitable coating material on the precursor film, e.g., particulate carbon, siliceous materials and the like may be deposited depending on the final result desired and limited by the process variables encountered.

Following the coating of the precursor film said film is subjected to a drawing step wherein the film is drawn or stretched. This can be done continuously in connection with coating unit or the film may be drawn in a separate step. Regardless of which procedure is followed, the coated film must be drawn to accomplish the objects of the invention. The coated film is drawn to impart the open-celled structure and to reduce the apparent density of same. The precise degree of drawing is important to this invention in that an optimization of useful properties takes place at intermediate extensions rather than at the highest amounts of stretch.

In order to obtain optimum levels of the characteristics mentioned hereinbefore, the coated films should be drawn at a draw ratio of from 1.10:1 to 4:1 and preferably 1.25:1 to 2:1, e.g., draw roll speed to feed roll speed. A higher draw ratio than 4:1 can be employed but ordinarily would not be employed since improvement in the open-celled structure is only slight in most instances and, in some instances, may actually be detrimental to the structure.

In accordance with the present invention, the coated precursor film is preferably "cold drawn" to impart the desired voidy structure. In this operation the coated film is drawn at the above draw ratios at ambient or near-ambient temperatures. The drawing per se may be performed in any convenient manner using known techniques where a film is positively forwarded by one moving means to a second moving means operating at a higher speed. The temperature of the film per se being drawn is referred to herein as the draw termperature.

The present invention also contemplates drawing the coated precursor film at sub-ambient temperatures, as well as at temperatures above ambient. However, the upper limit of the draw temperature range has been found to be critical and it is essential that this limit not be exceeded. For example, it is found that substantial reduction in the apparent density of polypropylene film can be effected up to a temperature of about 200° F. (93.3° C.) but when this temperature is exceeded there is a marked decrease in the reduction of the apparent density of the film. Surprisingly, in this instance, essentially no reduction can be accomplished when the upper limit of the drawing operation is exceeded by about 20° F. (11.1° C.). Accordingly, the polypropylene films of the present invention are preferably not drawn at a temperature in excess of the 200° F. upper limit, the acetal films at a temperature not in excess of 255° F. and the polyethylene film not in excess of 220° F.

When the film is drawn at temperatures above ambient, said film may be heated by any conventional means. Preferably the film is heated by heated, moving rolls. However, the film may also be heated by passage over a heated plate, through a heated liquid, a heated gas, or the like.

In order to stabilize the coated open-celled film the film is heat set or annealed after the drawing thereof, while said film is in the tensioned state. It has been found that heating the drawn film in a tensioned state at a temperature of 90° C. or above has a remarkable influence on the dimensional stability of the open-celled low density characteristics of same. Accordingly, the drawn film is stabilized against excessive shrinkage, etc. by heating at a temperature which may be somewhat higher than the drawing temperature and while being held under a tension such that the film is not free to shrink or can shrink to only a controlled extent, e.g., not greater than 15% of the initial length. In order to insure maximum relaxation of the strains introduced into the films during the earlier processing thereof and thus impart the desired stability, the heat treatment is preferably carried out at a temperature within the range of from about 100° C. to about 160° C. for polypropylene, 100 to 160° C. for acetal polymers, 100 to 135° C. for polyethylene, etc. The period of heat treatment should be longer than about 0.1 second and may be within the range of about 0.5 second to about 30 minutes, preferably about 2 seconds to 15 minutes. The drawing operation and the heat treatment may be carried out sequentially or they may be combined in a single operation, e.g., by stretching the film over a metal surface, e.g., rolls, heated to required temperature. As may be surmised from the foregoing discussion, the apparent density of the resulting heat treated low density film is significantly below that of the precursor film.

The resultant film, in a tensionless state, has an apparent density lower than the density of the polymeric material from which it is formed, usually no greater than 95%, preferably about 50 to 75%, of the densities of the corresponding polymer material. The sizes of the passageways to the void or pore spaces of the open-celled film structure accessible to the outside planar surface of the film are under 5000 angstrom units, e.g., 150 to 5000 angstrom units, as porosimetrically determined by mercury penetration, which measurement also determines the volume of such void or pore space. The final crystallinity of these films is preferably at least 30%, more preferably at least 40% and more suitably at least 50%, e.g., 50 to 100%.

As stated, the elastic precursor films employed in this invention are composed of a polymer of a type capable of developing a significant degree of crystallinity, as contrasted with more conventional or "classical" elastic materials such as a rubber which are substantially amorphous in the unstretched or tensionless state.

A significant group of polymers to which this invention may be applied are the olefin polymer, e.g. polypropylene, poly-3-methyl butene-1, poly-4-methyl pentene-1, polyethylene as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexene-1, n-hexadecene-1, n-octadecene-1, or other relatively long chain alkenes, as well as copolymers of 3-methyl pentene-1 and any of the same n-alkenes mentioned previously in connection with 3-methyl butene-1. These polymers in the form of films generally have a percent crystallinity of at least 50%, e.g., 50 to 60%.

Another group of polymers to which this invention may be applied are high molecular weight acetal polymers. While acetal (or oxymethylene) homopolymers are contemplated, the preferred oxymethylene polymer is a "random" oxymethylene copolymer, i.e., one which contains recurring oxymethylene, i.e., —$CH_2$—O—, units interspersed with —OR— groups in the main polymer chain where R is a divalent radical containing at least two carbon atoms directly linked to each other and positioned in the chain between the two valences, with any substituents on said R radical being inert, that is, those which do not include interfering functional groups and which will not induce undesirable reactions, and wherein a major amount of the —OR— units exist as single units attached to oxymethylene groups on each side. Examples of preferred polymers include copolymers of trioxane and cyclic ethers containing at least two adjacent carbon atoms such as the copolymers disclosed in U.S. Pat. No. 3,027,-352 of Walling et al. These polymers in film form also have a crystallinity of at least 50%, e.g., 50 to 60%.

Other relatively crystalline polymers to which the invention may be applied are polymethylene sulfide, polyethylene sulfide, polyphenylene oxide, polyamides such as polyhexamethylene adipamide (nylon 66) and polycaprolactam (nylon 6) and polyesters such as polyethylene terephthalate.

By means of this invention, coated polypropylene film may be obtained having, at 25° C. and 65% relative humidity, an elastic recovery from 50% extension of 50 to 90%, a tensile strength of 10,000 to 35,000 p.s.i., a breaking elongation of 200 to 350%, a modulus of 100,000 to 500,000 p.s.i. (all the foregoing in the machine direction). In addition, such polypropylene film generally has other properties within the following ranges: a haze of 20% to opaque, an $O_2$ transmittance of 100,000 to 150,000 and $N_2$ transmittance of 100,000 to 150,000 and a $CO_2$ transmittance of 15,000–30,000, the units of transmittance of the last three gases being given in cc./24 hrs./m.², atm. Other properties are void volume .565 to .075 cm.³/gm., density .60 to .85 gm./cm.³, and a pore size of 150 to 5000 angstroms, the values of the last three properties being determined by mercury porosimetry.

The coated films prepared in accordance with this invention of oxymethylene or acetal copolymers (such as those disclosed in Pat. No. 3,027,352) generally have properties in the machine direction within the following ranges at 25° C. and 65% relative humidity: elastic recovery from 50% extension of 50 to 90%, tensile strength of 10,000 to 50,000 p.s.i., breaking elongation of 50 to 150%, modulus of 100,000 to 350,000 p.s.i. In addition, such film generally has a haze of 20% to opaque, a density of .95 to 1.3 g./cm.³, a void volume of .343 to .061 and a pore size of 150 to 5000 angstroms, the values of the last three properties being determined by mercury porosimetry. The foregoing properties are merely illustrative of typical product profiles and do not therefore, limit the scope of the invention.

The invention is further illustrated by the following examples.

EXAMPLE I

Crystalline polypropylene of melt index 4.0 and density .905 g./cc. was melt extruded at 380° F. through an 8″ slit die of the coat hanger type using a 1¾″ extruder with a shallow channel metering screw. The length to diameter ratio of the extruder barrel was 24:1. The extrudate was drawn down very rapidly to a drawdown ratio of 90:1, contacted with a rotating casting roll maintained at 185° F. and ¼″ from the lip of the die. The film produced in this fashion was found to have the following properties:

Thickness—.001 inch
Elastic recovery from 50% strain—49%

The resulting film was oven annealed at 130° C. for 15 minutes. At the end of this period the film was removed from the oven and allowed to cool.

The annealed precursor film was introduced into a vacuum-metallizing chamber for the depositing of aluminum thereon. In accordance with the invention, the film was metallized using an Economy Coater Type CVE–15 (Consolidated Vacuum Corporation, Rochester 3, N.Y.).

The CVE unit is primarily a high vacuum evaporator or environmental chamber; it consists of a pumping system, which can readily evacuate a bell jar chamber. A low voltage, high current electrical power supply provides electrical energy for evaporating materials through resistance heating.

After deposition of an aluminum coating one sample of the coated film was stretched to 100% of its original length and annealed for 1 hour at 125° C. The moisture vapor transmission through the coated porous film was compared with the MVTR of the coated but unstretched film.

|  | MVTR g./24 hrs./m.² |
|---|---|
| PP aluminized (stretched 100%) | 701 |
| PP aluminized | 57 |

Thus, a greater than 10 fold increase is obtained in MVTR of the porous film.

The values of "recovery" given above are elastic recovery determined as follows at 25° C. and 65% relative humidity:

A sample 15 mm. in width was placed in an Instron tensile property testing machine with the jaw separation being 2″ apart. The sample was extended at the rate of 1″/min. until 50% extension was reached. The sample was held at that extension for 1 minute and then relaxed at the same rate as extended. A reading was recorded as soon as a no load condition was indicated by the Instron. The elastic recovery is then calculated as follows:

Elastic recovery
$$= \frac{\left(\begin{array}{c}\text{total length}\\\text{when extended}\end{array}\right) - \left(\begin{array}{c}\text{final distance}\\\text{between jaws}\end{array}\right)}{\text{length added when extended}} \times 100$$

The other properties mentioned were determined with standard ASTM methods as follows:

Tensile strength—ASTM #D882—Method A sample width 15 mm.
Breaking elongation—ASTM #D882—Method A sample width 15 mm.
Modulus—ASTM #D882—Method A sample width 1 inch
Moisture vapor transmittance—ASTM #9663T—Method B Procedure B
$O_2$, $N_2$, $CO_2$ transmittance—ASTM #D1434–63, Dow Cell Method, except that because of exceedingly high gas permeability, two pieces of film were laminated together with Interchemical Coating #NB483C which was less than .0001 inch in thickness.
Density—As determined by Mercury Penetration. See Textile Research Journal, vol. 33, pgs. 21 et seq. (1963) by R. G. Quynn.
Haze—ASTM #D1003 Procedure A as per FIG. 2.

The values of percent crystallinity given above are determined using the procedure described in an article by R. G. Quynn et al. in Journal of Applied Polymer Science, vol. 2, No. 5, pages 166–173 (1959).

The elastic films of this invention are useful as printable wrappers, microporous membranes for dialysis operations, etc.

It is to be understood that the foregoing detailed description is given merely by way of illustration and that many variations may be made therein without departing from the spirit of the invention. For example, a plurality of coatings may be applied to the film substrate employed. Such coatings may be similar or dissimilar, whatever the desired effect. Thus it is contemplated to employ a primer coat beneath a metal coat and then employ a protective lacquer coat over said metal coat to prevent removal of same.

The embodiments of the invention in which an exclusive property or privilege is claimed are defined as follows:

1. A metal coated plastic product comprising:
   (1) a microporous base polymer wherein the actual density of the polymer is gerater than the apparent density of the microporous base polymer when said product is stretched and,
   (2) a metal coating on said base microporous polymer, wherein said metal coated plastic product is characterized by a continuous uniform open celled structure comprised of pores extending to the surface of said metal coated plastic product, said pores having a size under 5000 angstrom units.

2. The coated plastic product of claim 1 wherein the thickness of said coating is from about 0.01 micron to 20 microns.

3. The coated plastic product of claim 1 wherein said base polymer has a crystallinity of at least 40%.

4. The coated plastic product of claim 3 wherein the polymer is polypropylene.

5. The coated plastic product of claim 3 wherein the ploymer is an oxymethylene polymer.

6. The coated plastic product of claim 3 wherein the polymer is polyethylene.

References Cited

UNITED STATES PATENTS

| | | | |
|---|---|---|---|
| 3,387,077 | 6/1968 | Sammons et al. | 264—289 |
| 3,382,306 | 5/1968 | Oppenlander | 264—178 |
| 3,257,488 | 6/1966 | Rasmussen | 264—288 |
| 2,985,503 | 5/1961 | Becker | 264—147 |
| 2,968,067 | 1/1961 | Long | 264—129 |
| 2,627,088 | 2/1953 | Alles et al. | 117—7 |
| 3,373,234 | 3/1968 | Schnizer et al. | 264—49 |
| 3,310,505 | 3/1967 | Parker | 264—49 |
| 3,143,436 | 8/1964 | Dosmann | 117—135.5 X |
| 3,143,434 | 8/1964 | Tennant | 117—135.5 X |
| 2,976,182 | 3/1961 | Caldwell et al. | 117—135.5 |
| 2,897,098 | 7/1959 | Homer et al. | 117—107 X |
| 2,848,752 | 8/1958 | Bechtold | 117—135.5 |
| 3,377,190 | 4/1968 | Baguley | 117—135.5 X |
| 3,384,506 | 5/1968 | Elkin | 117—135.5 X |
| 3,455,727 | 7/1969 | Dye | 117—135.5 X |

ALFRED L. LEAVITT, Primary Examiner

A. GRIMALDI, Assistant Examiner

U.S. Cl. X.R.

117—135.5; 264—41, 95, 134, 288

 UNITED STATES PATENT OFFICE
CERTIFICATE OF CORRECTION

Patent No. 3,539,374      Dated November 10, 1970

Inventor(s) Robert B. Isaacson

It is certified that error appears in the above-identified patent and that said Letters Patent are hereby corrected as shown below:

In the specification, Column 5, line 3, the word "substrate" should read -- substitute --.

SIGNED AND SEALED
MAR 16 1971

(SEAL)
Attest:

Edward M. Fletcher, Jr.
Attesting Officer

WILLIAM E. SCHUYLER, JR.
Commissioner of Patents